US008951320B2

(12) United States Patent
Galdkov

(10) Patent No.: US 8,951,320 B2
(45) Date of Patent: Feb. 10, 2015

(54) DEVICE FOR PURIFYING GAS BY EXTRACTING PARTICLES

(75) Inventor: Serguei Galdkov, Lexy (FR)

(73) Assignee: Alfyma Industrie, Bailly-Romainvilliers (FR)

( * ) Notice: Subject to any disclaimer, the term of this patent is extended or adjusted under 35 U.S.C. 154(b) by 0 days.

(21) Appl. No.: 13/823,468

(22) PCT Filed: Mar. 2, 2012

(86) PCT No.: PCT/EP2012/053667
§ 371 (c)(1),
(2), (4) Date: Mar. 14, 2013

(87) PCT Pub. No.: WO2012/117102
PCT Pub. Date: Sep. 7, 2012

(65) Prior Publication Data

US 2013/0186047 A1 Jul. 25, 2013

(30) Foreign Application Priority Data

Mar. 2, 2011 (FR) ..................................... 11 51705

(51) Int. Cl.
*B01D 41/00* (2006.01)
*B04C 5/185* (2006.01)

(52) U.S. Cl.
CPC ..................................... *B04C 5/185* (2013.01)
USPC .................. 55/297; 55/428; 55/429; 55/430; 55/432; 55/342; 55/343; 55/345; 55/349; 55/282; 55/346

(58) Field of Classification Search
USPC .................. 55/428, 429, 430, 432, 342, 343, 55/345–349, 282, 297
See application file for complete search history.

(56) References Cited

U.S. PATENT DOCUMENTS 7,534,279 B2 * 5/2009 Oh et al. ......................... 55/343
2008/0172824 A1 * 7/2008 Yun et al. ....................... 15/352
2011/0000047 A1 1/2011 Ji et al.

FOREIGN PATENT DOCUMENTS

| | | |
|---|---|---|
| DE | 26 06 483 | 8/1976 |
| DE | 201 20 247 | 4/2003 |
| FR | 1 392 842 | 3/1965 |
| FR | 2 560 786 | 9/1985 |

OTHER PUBLICATIONS

International Search Report dated Jun. 12, 2012, in corresponding PCT application.

* cited by examiner

*Primary Examiner* — Dung H Bui
(74) *Attorney, Agent, or Firm* — Young & Thompson

(57) ABSTRACT

A purifying device provided with a device for collecting particles, such as dust includes a chamber having an inner wall that is generally cylindrical around a central axis (X), the inner wall extending parallel to the central axis between first and second substantially parallel faces, wherein the chamber has an inlet opening and an outlet opening. The collecting device also includes a rotor which is rotatable around the central axis, and which includes at least three blades, each of which extend radially from a rotary shaft to the inner wall while defining, within the chamber, compartments which are sized such that the inlet and outlet openings are in constant communication with separate compartments. The inlet opening is provided in the first base and the outlet opening is provided in the second base.

15 Claims, 5 Drawing Sheets

DEVICE FOR PURIFYING GAS BY EXTRACTING PARTICLES

BACKGROUND OF THE INVENTION

The present invention relates to a device for purifying a gas, such as air, by extracting particles, such as dust, and more particularly, a device for collecting particles, designed for such a purifying device.

DESCRIPTION OF THE RELATED ART

Already known in the state of the art is a particle collecting device, also called a "rotary discharger," comprising a chamber defined by an inner wall that is generally cylindrical around a central axis, having an inlet opening and an outlet opening for the particles. These inlet and outlet openings are generally coaxial and formed in the cylindrical wall.

Such a rotary discharger generally includes a rotor, comprising at least three blades, rotating around the central axis, each blade extending radially from an end for fastening to a shaft, rotating around the central axis, up to the free end designed to scrape the inner wall. These rotary blades define, in the chamber, compartments sized so that the inlet and outlet openings constantly emerge in separate compartments. Thus, the rotary blades form an airlock making it possible to isolate the inlet and outlet openings from each other.

When a blade is rotating, its free end scrapes the inner wall so as to drive the particles from the inlet opening to the outlet opening. In some cases, for example when the particles are wet, it is possible for the discharger to become clogged. In that case, the free end of each blade is subjected to a significant resistance force, which causes significant pulling out torque at its fastening end.

As a result, the free end can wears out rapidly under the effect of the resistance force, or the fastening end of the shaft can detach from that shaft under the effect of the pulling out torque. In other words, the lifetime of the blades of such a rotary discharger is reduced.

SUMMARY OF THE INVENTION

The invention in particular aims to resolve this drawback by providing a device for collecting particles in which the blades are subjected to stresses less significant than those applied to a device of the state of the art.

To that end, the invention in particular relates to a device for collecting particles, such as dust, designed to equip a device for purifying a gas by extracting particles, including:

- a chamber, including an inner wall that is generally cylindrical around a central axis, said inner wall extending parallel to the central axis between first and second substantially parallel bases, the chamber having an inlet opening and an outlet opening,
- a rotor which is rotatable around the central axis, and which includes at least three blades, each of which extends radially from a rotary shaft to the inner wall while defining, within the chamber, compartments which are sized such that the inlet and outlet openings are in constant communication with separate compartments.

Due to this arrangement of the inlet and outlet openings, the particles enter and leave the chamber in a direction substantially parallel to the axis of rotation of the blades. Thus, the particles tend to accumulate on the second base rather than on the cylindrical wall, and are therefore scraped by an edge of each blade that is secured, at one of its ends, to the rotating shaft.

Thus, due to the fact that the scraped particles are distributed on the entire radial dimension of each blade rather than at its free end, the pulling out torque that may be applied by these particles is less significant than in the state of the art. The blades are therefore subject to fewer stresses, with the result that their lifetime is increased.

Optionally, a collecting device according to the invention may include one or more of the following features, considered alone or according to all technically possible combinations:

- each inlet and outlet opening has dimensions, in particular a diameter, smaller than half of a diameter of the chamber,
- the first base is provided, at the end of the chamber, with means for driving particles toward the inlet opening,
- the driving means include blades for scraping an outer face of the first base, preferably rotating around the axis, each extending from a rotating shaft.

The invention also relates to a device for purifying a gas, such as air, by extracting particles, such as dust, including a collecting device, and at least one device for separating particles and gas, including an inlet duct for gas charged with particles, a cleaned gas outlet duct, and an outlet duct for the particles arranged upstream from the inlet opening of the collecting device.

Optionally, the purifying device may include one or more of the following features, considered alone or according to all technically possible combinations:

- each separating device includes an air circulation enclosure, which is generally cylindrical, in which the gas inlet and outlet ducts emerge, and extending up to the first base of the collecting device, each separating device also comprising a guide member with a generally conical tapered shape, arranged substantially coaxially to the cylindrical enclosure, and the large cross-section of which has a diameter smaller than that of the cylindrical enclosure and is arranged across from the first base of the collecting device,
- each separating device includes means for translating the guide member along its axis and/or means for causing that guide member to vibrate,
- each separating device includes an air circulation enclosure, which is generally substantially cylindrical, in which the gas inlet and outlet ducts emerge, and extending up to the first base of the collecting device, the purifying device comprising a blower nozzle arranged between the air circulation enclosure and the first base of the collecting device, oriented toward the air circulation enclosure,
- the nozzle includes a member for orienting the blown gas,
- the cylindrical enclosure has a diameter substantially equal to that of the first base,
- the purifying device includes at least two separate devices, housed in a cylindrical support element, arranged in parallel, and positioned in a circle with a diameter smaller than that of the first base, the outlet duct for the particles of each separating device being arranged across from said first base,
- the purifying device includes a general gas supply duct, connected to the inlet duct of each separating device by means of a supply enclosure, and a general gas discharge duct, connected to the outlet duct of each separating device by means of a discharge enclosure,
- one among the supply duct and the discharge duct extends substantially tangentially to the cylindrical support element, and the other among the supply duct and the discharge duct extends substantially coaxially or tangentially to the cylindrical support element, the purifying device includes a plurality of separating devices arranged in parallel, and positioned in a spiral with a diameter smaller than that of the first base, the outlet duct for the particles of each separating device being arranged across from said first base, the purifying device includes a central separating device whereof the diameter is larger than that of the other separating devices, arranged at the center of spiral, each separating device includes an air circulation enclosure, comprising a first substantially cylindrical portion, in which the gas inlet and outlet ducts emerge, and a second substantially tapered portion, extending while becoming narrower from a large cross-section connected to the first part to a small cross-section arranged across from the first base of the collecting device, and a third substantially tapered portion, extending while becoming wider from a small cross-section connected to the small cross-section of the second tapered portion, up to a large cross-section arranged across from the first base of the collecting device, the large cross-section of the third tapered portion has a diameter substantially equal to that of the first base of the collecting device.

BRIEF DESCRIPTION OF THE DRAWING FIGURES

The invention will be better understood upon reading the following description, provided solely as an example and done in reference to the appended figures, in which: line FIG. 1 is a perspective view of a device for purifying a gas according to a first example embodiment of the invention;

DETAILED DESCRIPTION OF THE INVENTION

Figure 1:
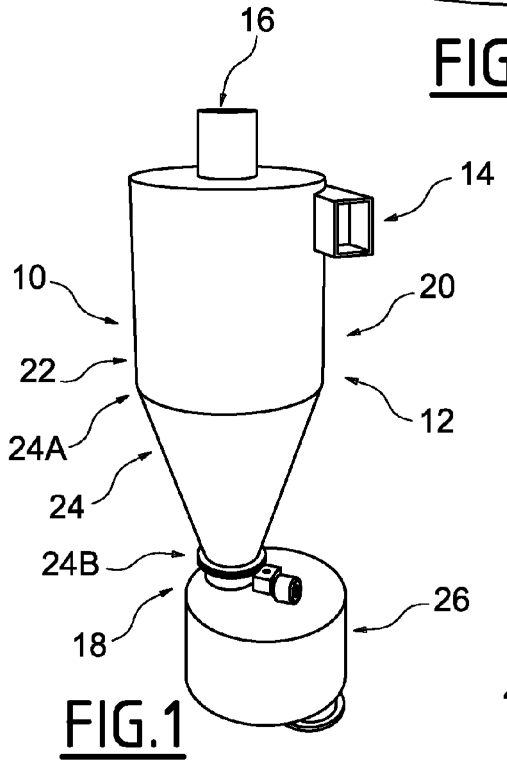

FIG. 1 shows a device 10 for purifying a gas, such as air, by extracting particles, such as dust, according to a first example embodiment of the invention.

The purifying device 10 includes a device 12 for separating particles and gas, including a gas inlet duct 14, including an inlet duct 14 for gas charged with particles, an outlet duct 16 for cleaned gas, and an outlet duct 18 for particles.

The separating device 12 is of the "cyclone" type, separating the particles through a swirling circulation of gases charged with particles and centrifugation of those particles.

The separating device 12 includes a hollow body 20 defining an air circulation enclosure, comprising a first substantially cylindrical portion 22, in which the gas inlet 14 and outlet 16 ducts emerge, and a second substantially tapered portion 24, extending while becoming thinner from a large cross-section 24A connected to the first portion 22 to a small cross-section 24B forming the outlet duct of the particles 18.

The inlet duct 14 for the gas charged with particles is inclined relative to the radial direction, with the result that it imposes a rotation on the gas flow entering the enclosure. The gas flow is guided by the wall of the hollow body 20 up to the vicinity of the apex of the tapered portion 24, thereby forming a vortex, and axially rises in the circulation enclosure up to the outlet duct 16. In fact, that outlet duct 16 is arranged at an upper end of the cylindrical portion 22, coaxially to said cylindrical portion 22.

Due to the rotation of the gas flow, the solid particles comprised in that gas flow are subject to a centrifugal force, which drives those particles toward the wall of the hollow body 20. When those particles come into contact with that wall, they lose their speed due to friction, then fall into the lower portion of the enclosure to exit through the outlet duct 18 for the particles.

The purifying device 10 also includes a device 26 for collecting the particles arriving at the outlet duct 18, arranged downstream of that outlet duct 18. Said collecting device 26 is shown in more detail in FIG. 2.

The collecting device 26, also called "rotary discharger," includes a chamber 28, defined by an inner wall 30 that is generally cylindrical around a central axis X, said inner wall extending parallel to the axis X between first 32 and second 34 bases, which are substantially parallel, and perpendicular to the axis X.

An inlet opening 36 is formed in the first base 32 and an outlet opening 38 is formed in the second base 34. Preferably, each inlet opening 36 and outlet opening 38 has dimensions, in particular a diameter, smaller than half of a diameter of the chamber. In this way, the inlet 36 and outlet 38 openings are radially offset relative to one another, so as not to have any portions across from each other.

It will be noted that the central axis X is vertical when the inlet opening 36 is arranged toward the top, and the outlet opening 38 toward the bottom, so as to favor driving of the particles by gravity.

The separating device 12 is connected to the collecting device 26, by connection of the particle outlet duct 18 to the inlet opening 36. The collecting device 26 is thus designed to collect the particles separated from the gas in the separating device 12.

Figure 2:
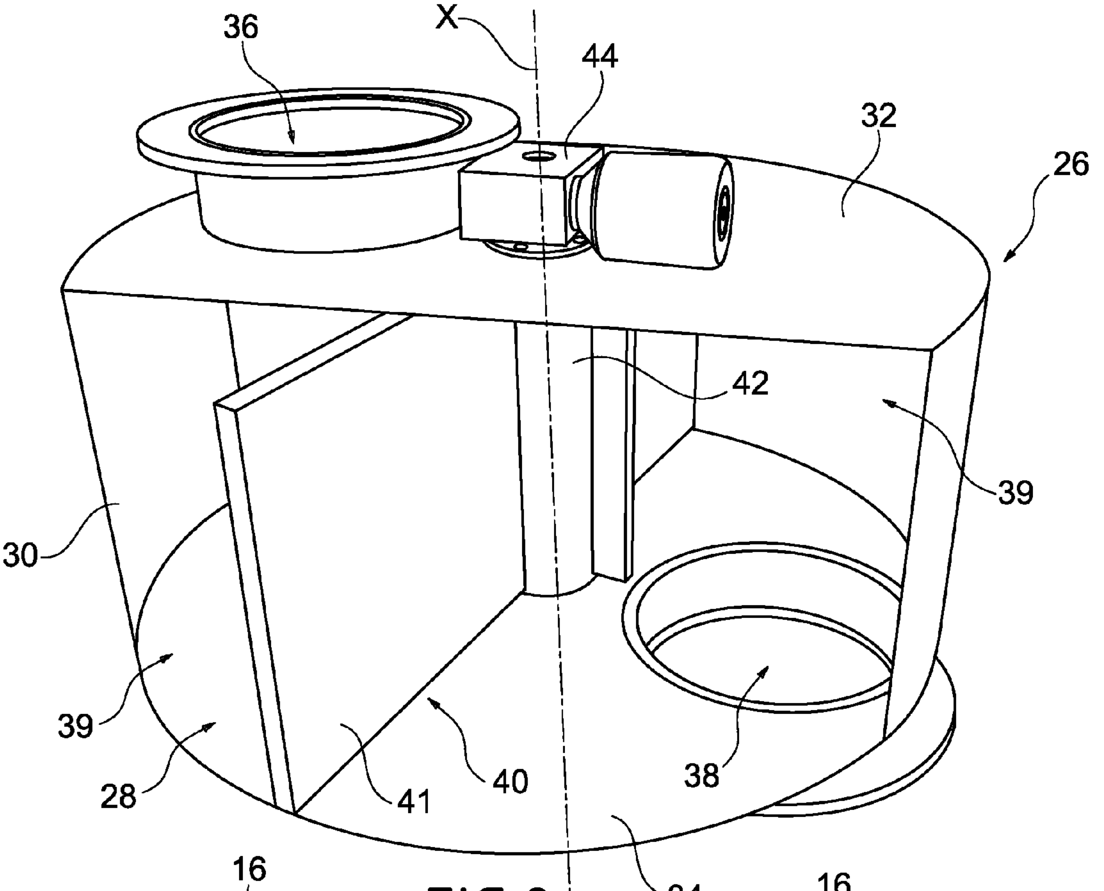
FIG. 2 is a partial perspective view of a device for collecting particles equipping the purifying device of FIG. 1.

The collecting device 26 includes a rotor 40 rotating around the axis X. That rotor 40 comprises at least three blades 41, for example four blades 41 as shown in FIG. 2, in which one of the blades is shown truncated.

Each blade 41 extends radially from a rotating shaft 42 actuated by a motor unit 44, up to the inner wall 30, defining, in the chamber 28, compartments 39 sized so that the inlet 36 and outlet 38 openings constantly emerge in separate compartments 39. Thus, the inlet 36 and outlet 38 openings are isolated relative to one another, with the result that no gas flow can circulate between those openings. It is thus ensured that the gas flow circulating in the circulation enclosure of the separating device 12 is indeed discharged through the outlet duct 16.

The blades 41, by rotating around the axis X, drive the particles coming from the inlet opening 36 toward the outlet opening 38.

In fact, the particles coming from the inlet opening 36 fall by gravity on the second base 34, then the blades 41 scrape that second base 34 while pushing those particles as far as the outlet opening. It will be noted that the layer of particles scraped by the blades 41 forms an air seal, even when the blades 41 are worn on their lower edge scraping the second base 34. In other words, this wear of the blades 41 does not cause a noticeable loss of sealing.

Figure 3:
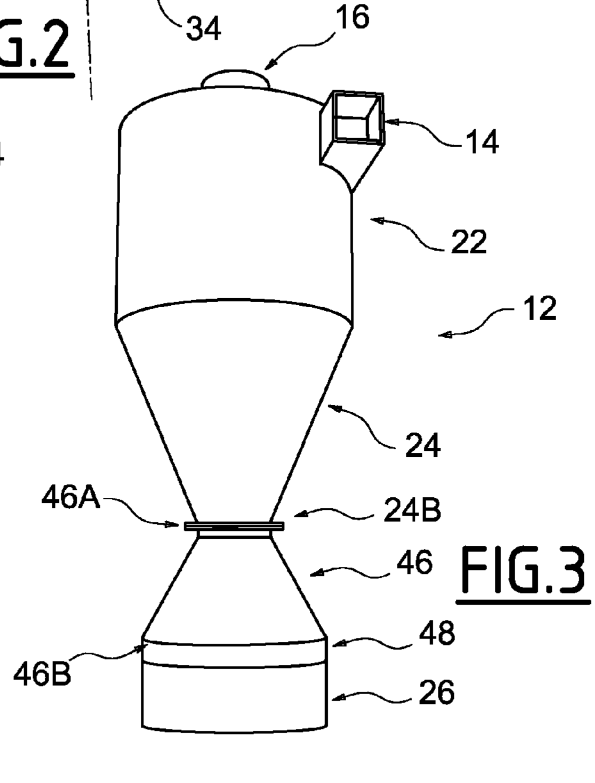
FIG. 3 is a perspective view of a device for purifying a gas according to a second example embodiment of the invention.
Figure 4:
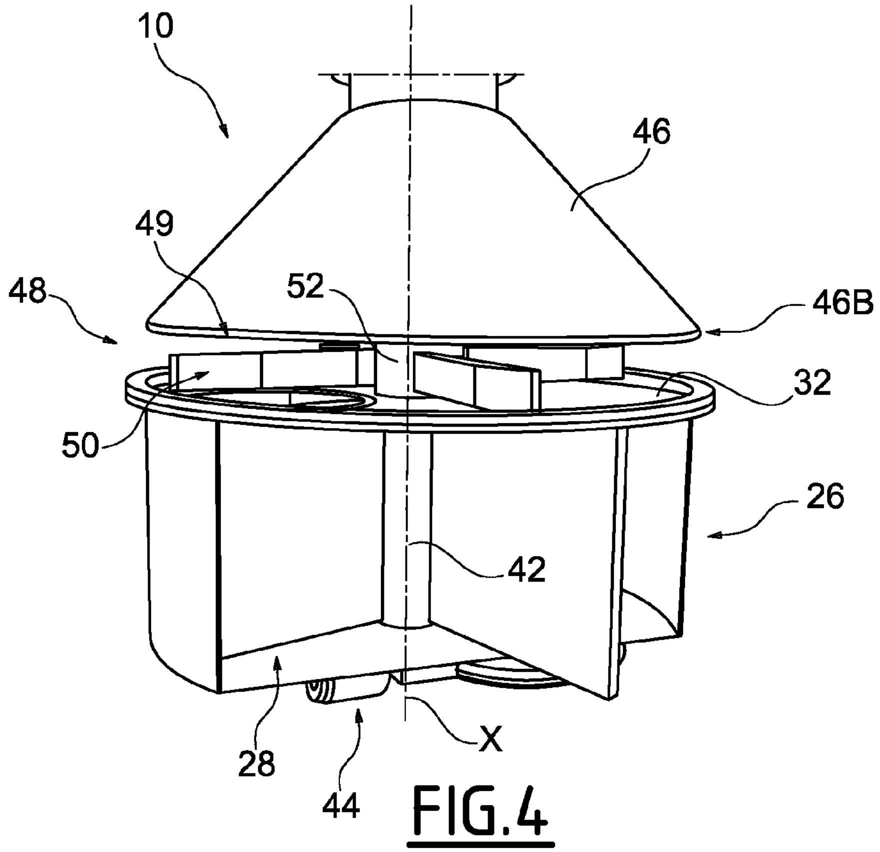
FIG. 4 is a partial perspective view of the purifying device of FIG. 3.

FIGS. 3 and 4 show a purifying device 10 according to the second example embodiment of the invention. In these figures, the elements similar to those of the preceding figures are designated using identical references.

According to this second embodiment, the separating device 12 includes a third substantially tapered portion 46, extending while becoming wider from the small cross-section 46A connected to the small cross-section 24B of the second tapered portion 24, to a large cross-section 46B arranged across from the first base 32 of the collecting device 26, as in particular shown in FIG. 4.

This third tapered portion 46 favors the driving of the particles toward the collecting device 26.

In fact, it appears that, when the particles bounce on the wall of a tapered portion, they are driven perpendicular to that wall. Thus, when that tapered portion extends while becoming thinner toward the bottom, a particle bouncing on the wall of the tapered portion would be deviated upward, and risk entering the rising gas flow. However, since that third tapered portion 46 extends while becoming wider toward the bottom, in particular toward the first base 32, the particles that bounce on those walls are driven toward that first base 32, and not toward the rising gas flow.

However, the large cross-section 46B of that third tapered portion 46 is considerably larger than the inlet opening 36 of the collecting device 26. In fact, according to the illustrated example, this large cross-section 46B has a diameter substantially equal to that of the first base 32. Thus, this large cross-section 46B cannot be directly connected to the inlet opening 36.

The collecting device 26 is then provided, on the outside of the chamber 28, with means 48 for driving particles toward the inlet opening 36. Preferably, these driving means 48 form a scraping device, including an auxiliary rotor 49, comprising blades 50, for example four blades 50, for scraping an outer face of the first base 32. These blades 50 rotate around the axis X, and extend from an end connected to a rotating shaft 52 to a free end. This shaft 52 is for example rotated by the same motor unit 44 as the shaft 42.

Figure 5:
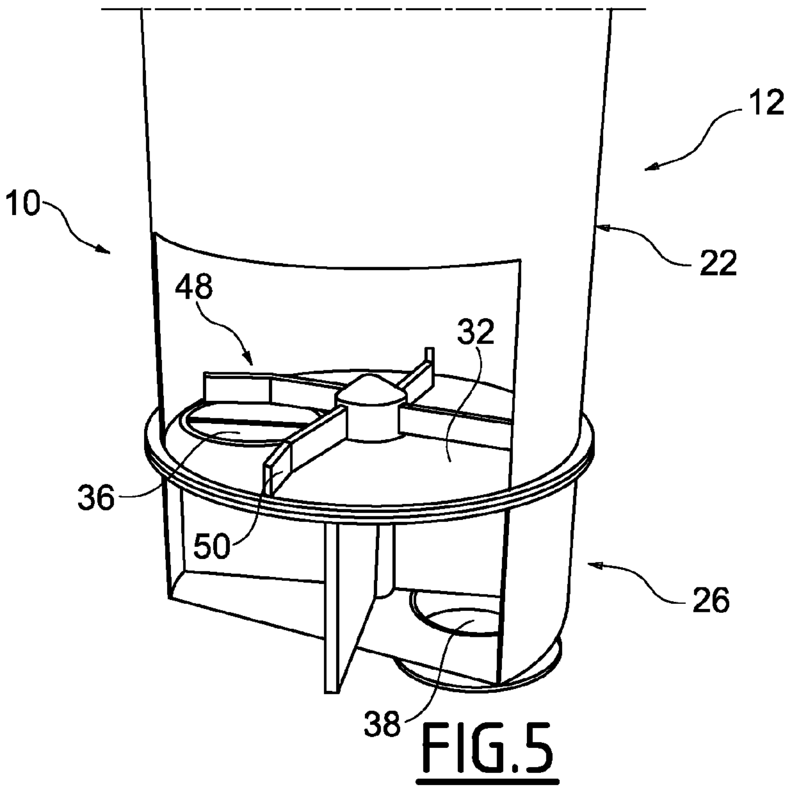
FIG. 5 is a partial perspective view of a purifying device according to a third example embodiment of the invention.

FIG. 5 shows a purifying device 10 according to a third example embodiment of the invention. In this figure, the elements that are similar to those of the preceding figures are designated using identical references.

According to this third embodiment, the separating device 12 includes a hollow body made up of a cylindrical portion 22, with a diameter substantially equal to that of the first base 32 of the collecting device 26, and extending up to that first base 32.

The collecting device 26 is identical to that of the second embodiment previously described.

Figure 6:
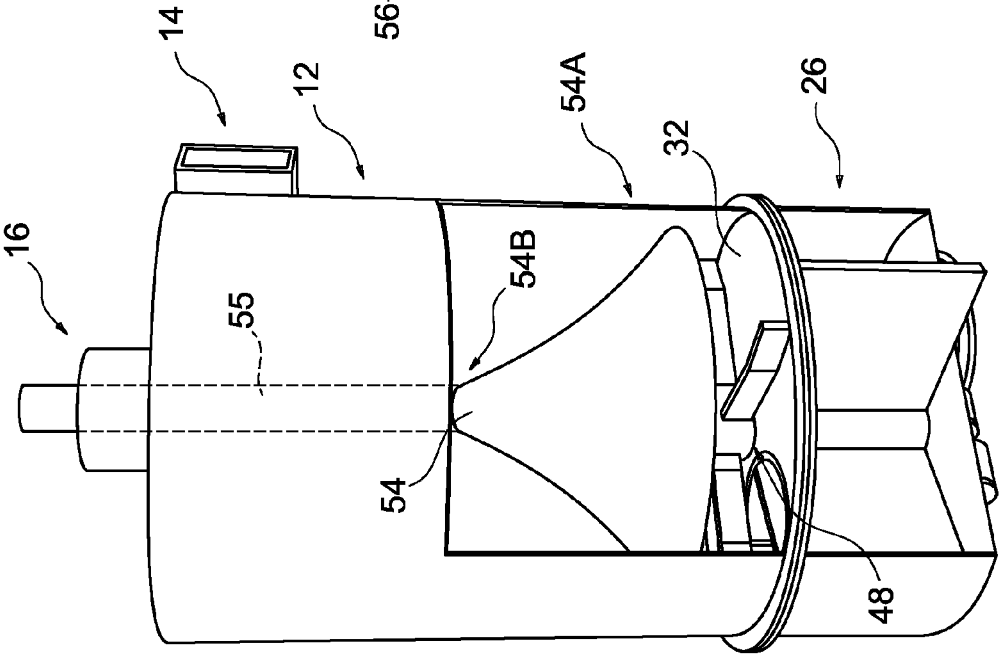
FIG. 6 is a partial perspective view of a purifying device according to a fourth example embodiment of the invention.

FIG. 6 shows a purifying device 10 according to a fourth example embodiment of the invention. In that figure, the elements that are similar to those of the preceding figures are designated using identical references.

According to this fourth embodiment, the separating device 12 includes a cylindrical hollow body 22 similar to that of the third embodiment described above.

However, the separating device 12 also includes a guide member 54, having a generally conical or tapered shape, whereof the large cross-section 54A has a diameter smaller than that of the cylindrical portion 22 and is arranged across from the first base 32 of the collecting device 26. The guide member 54 also has a small cross-section 54B, turned toward the gas outlet duct 16, from which a fastening rod 55 extends, through the outlet duct 16.

Such a guide member 54 in particular allows the particles coming into contact with its conical wall to be pushed back toward the walls of the cylindrical body 22, on which the gas flow circulates downward. Furthermore, such a guide member 56 limits the creation of a vacuum, at the center of the circulation enclosure, under the effect of the gas flows circulating while rotating along the cylindrical wall.

Preferably, the separating device 12 includes means for translating the guide member 54 along it is axis. To that end, the rod 55 for example includes a threaded portion cooperating with a fixed nut, so as to allow said rod 55, and therefore the guide member 54, to move by screwing.

This movement of the guide member 54 makes it possible to modify the configuration of the cylindrical enclosure 20, in particular the outlet duct for the particles 18. For example, it is possible to provide an outlet aperture for the particles between the large cross-section 54A and an opposite rim supported by the cylindrical portion 22, the width of that aperture depending on the height of the guide member 54. The width of that aperture can be adjusted by moving the guide member 54. In fact, this width must not be too narrow to allow the passage of the particles, or too wide so as not to disrupt the flow of air circulating in the enclosure 20.

Optionally, the separating device 12 also includes means for causing the guide member to vibrate. Such vibrations favor the passage of the particles through said aperture, even when the aperture is relatively narrow.

The collecting device 26 is similar to that of the second and third embodiments previously described.

Figure 7:
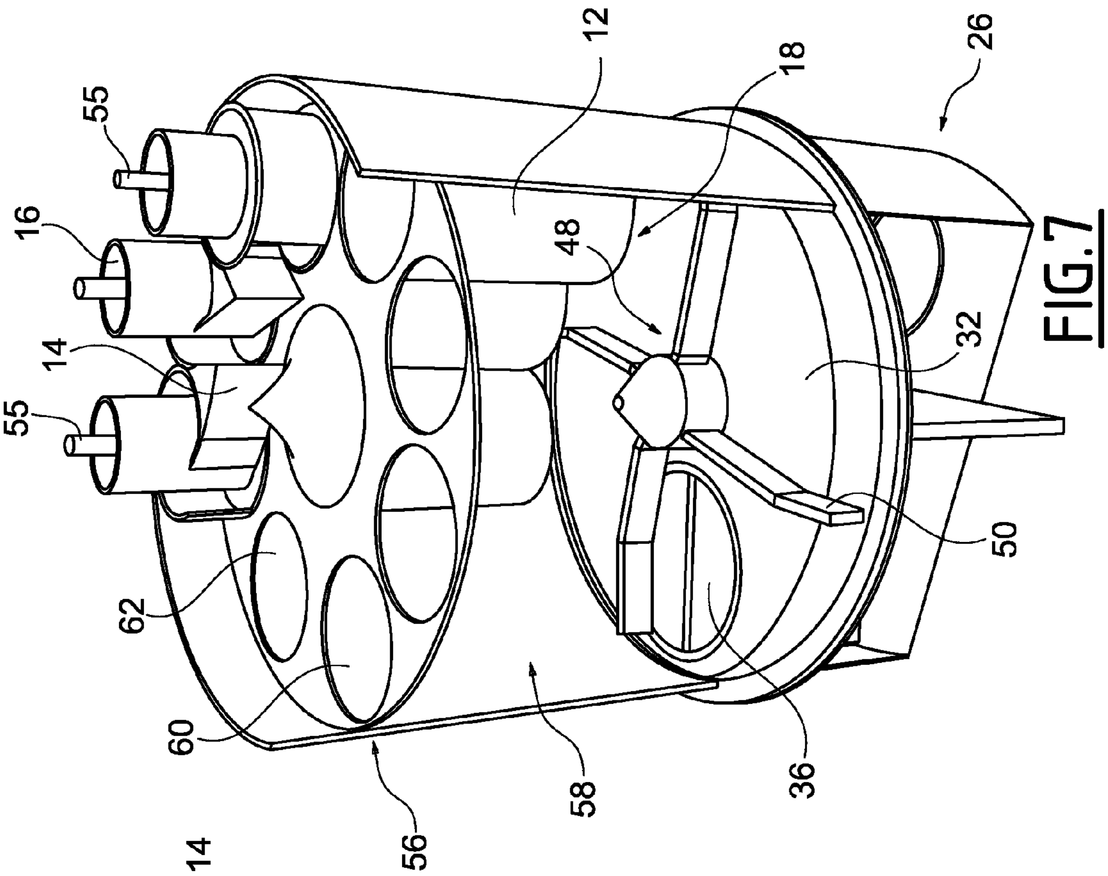
FIG. 7 is a partial perspective view of a purifying device according to a fifth example embodiment of the invention.

FIG. 7 shows a purifying device according to a fifth example embodiment of the invention. In that figure, the elements that are similar to those shown in the preceding figures are designated using identical references.

It will be recalled that centrifugal force, in particular in a separating device, is expressed as $F=mV^2/R$, where:

m is the mass of the object subject to the centripetal force,

V is the velocity of that object, and

R is the curve radius of the trajectory of that object, therefore, in the case of the separating device 12, the radius of the air circulation enclosure.

Thus, for a same linear velocity of the inlet of a separating device 12, the centrifugal force is greater for a smaller radius of the circulation enclosure. However, it is not possible to pass a large flow of air into a small separating device, in particular due to pressure losses.

In order to optimize the centrifugal force without limiting the airflow, the fifth embodiment provides for arranging at least two separating devices in parallel, for example eight separating devices 12 positioned in a circle around the axis X, with a diameter smaller than that of the first base 32, the outlet duct 18 for the particles of each separating device 12 being arranged across from that first base 32.

Thus, the gas flow is distributed between the separating devices 12, which makes it possible to preserve a sufficient flow rate. Furthermore, the radius of each of said separating devices 12 being smaller than that of the separating devices 12 previously described, the centrifugal force in each of the separating devices 12 is greater, and therefore allows better separation of the particles from the air.

The outlet duct 18 for the particles of each of said separating devices 12 is arranged upstream from the inlet opening 36 of the collecting device 26, which is shared by said separating devices 12. To that end, these outlet ducts 18 are arranged across from the first base 32 of the collecting device 26, which includes means 48 for driving particles toward the inlet opening 36, as was previously described.

Thus, owing to the driving means 48, such a collecting device 26 is particularly suitable for collecting particles coming from a plurality of separating devices 12.

It will be noted that the separating devices 12 are kept above the collecting device 26 by means of a support 56 comprising a cylindrical support element 58 resting on the collecting device 26 and bearing a plate 60 provided with openings 62 for receiving and supporting separating devices 12.

Each separating device 12 can be of any type as described above, having a reduced radius.

Figure 8:
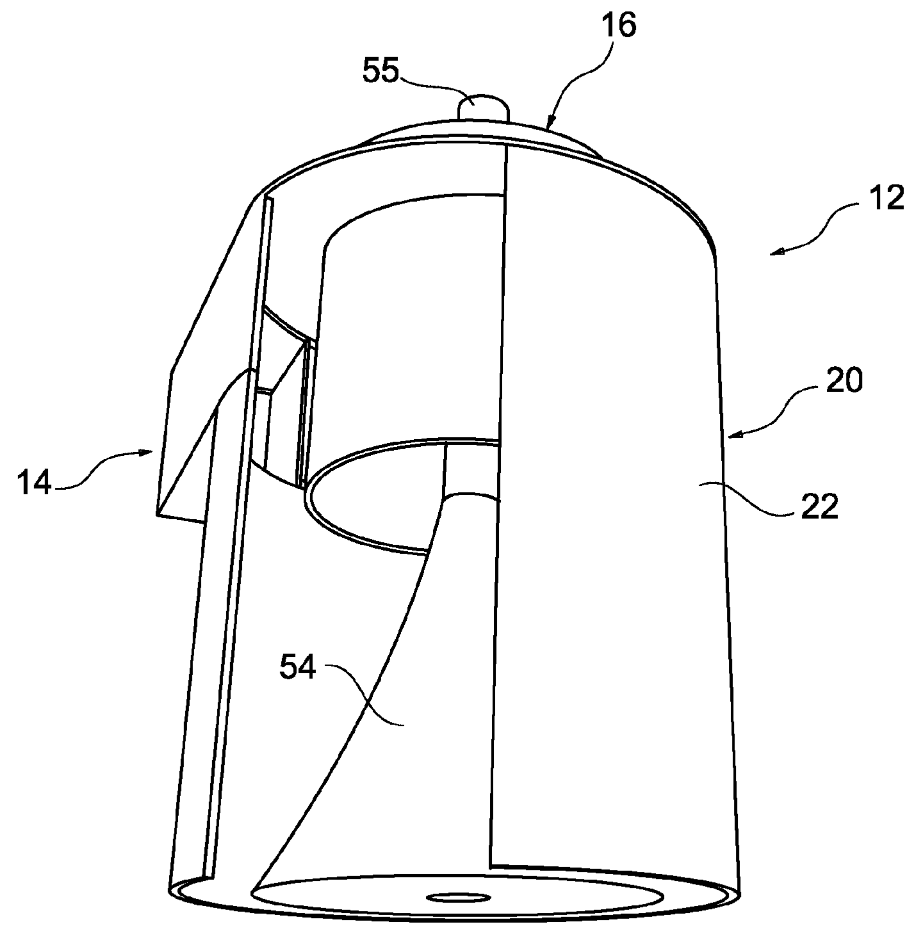
FIG. 8 is a partial perspective view of a device for separating particles designed to equip the purifying device of FIG. 7.

FIG. 8 shows an example of separating devices 12 equipping the purifying device 10 of FIG. 7.

According to this example, the separating device 12 is of the type including a cylindrical portion 22 in which the gas inlet duct 14 emerges, and comprising a guide member 54 with a general conical shape similar to that described in reference to FIG. 6.

Figure 9:
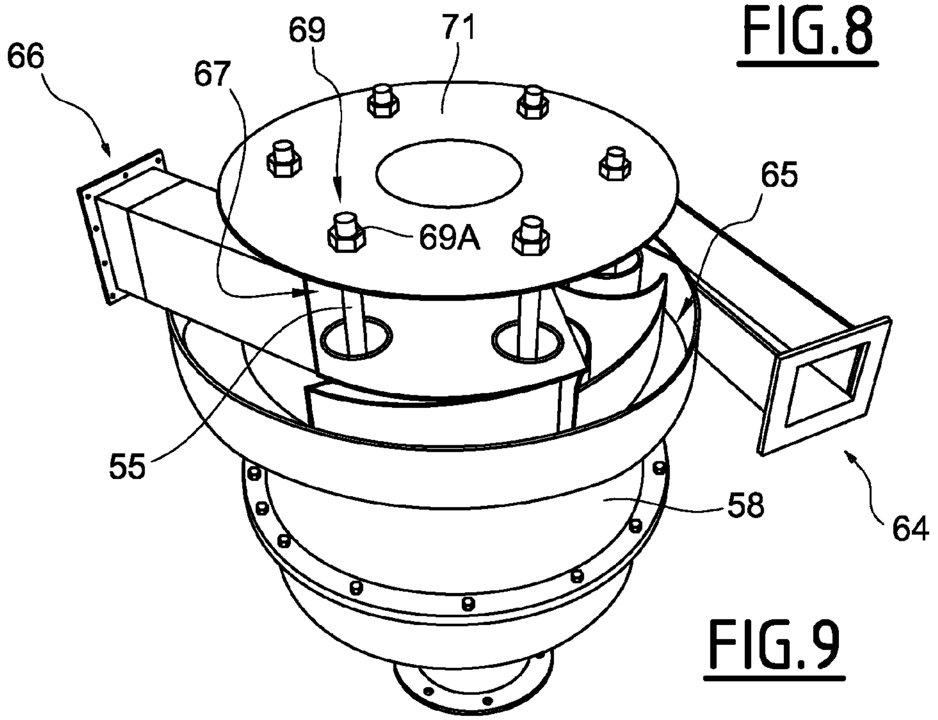
FIG. 9 is a perspective view of a set of separating devices arranged according to a first alternative, designed to equip the purifying device of FIG. 7.

In order to arrange the separating devices 12 in parallel relative to the gas flow, the purifying device 10 includes, as shown in FIG. 9, at least one general supply duct 64 and one general gas discharge duct 66.

The general supply duct 64 is connected to the inlet duct 14 of each separating device 12 by means of a supply enclosure 65, in which that general supply duct 64 and those inlet ducts 14 emerge.

Furthermore, the general gas discharge duct 66 is connected to the outlet duct 16 of each separating device 12 by means of a discharge enclosure 67, in which that general discharge duct 66 and those outlet ducts 16 emerge.

According to this embodiment, each of the supply 64 and discharge 66 ducts extends substantially tangentially to the cylindrical support element 58. Alternatively, one of these supply 64 and discharge ducts may extend coaxially to the cylindrical support element 58.

It will be noted that the means for translating each guiding member 54 along its axis are shown in said FIG. 9, and are designated therein by reference 69. These movement means 69 include a nut 69A fixed on a plate 71, cooperating with the rod 55 of the corresponding guide member 54.

Figure 10:
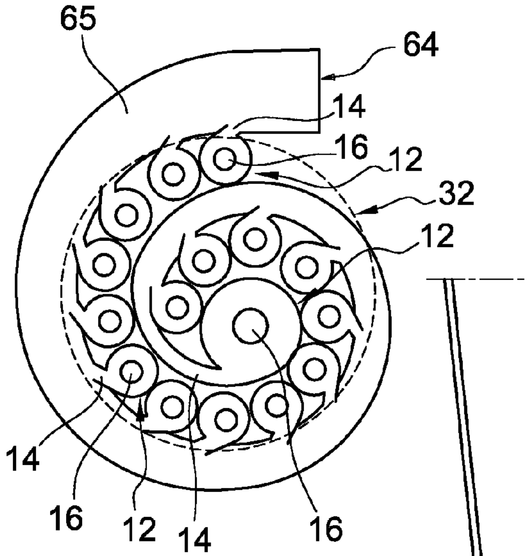
FIG. 10 is a diagrammatic top view of one arrangement of the set of separating devices designed to equip a collecting device similar to that of FIG. 7.

Alternatively, as shown in FIG. 10, the supply enclosure 65 may have a spiral shape with a diameter smaller than that of the first base 32, a plurality of separating devices 12 being connected to that general supply duct 64 by means of their respective inlet ducts 14. This spiral configuration is done such that the outlet duct 18 for the particles of each separating device 12 is arranged across from the first base 32.

The device preferably includes a central separating device 12 with a diameter larger than that of the other separating devices 12, arranged at the center of the spiral supply enclosure 65, so as to recover all of the particles that have not entered the other separating devices 12.

Figure 11:
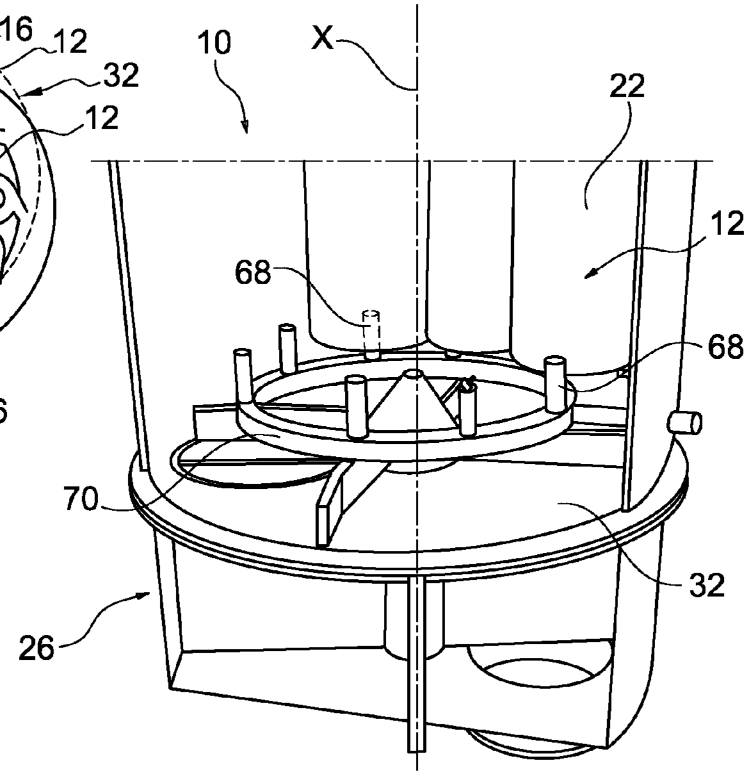
FIG. 11 is a truncated perspective view of a purifying device according to a sixth example embodiment of the invention.

FIG. 11 shows a purifying device 10 according to a sixth example embodiment of the invention. In that figure, the elements that are similar to those of the preceding figures are designated using identical references.

The purifying device 10 according to this sixth embodiment, just like that of the fifth embodiment, includes a plurality of separating devices 12 arranged in a circle around the axis X.

This sixth embodiment differs from the fifth embodiment in that each separating device includes an air circulation enclosure 22 made up of a substantially cylindrical portion, provided with no guide member 54.

In such a separating device 12, the spiral gas flow forms a vortex generally generating a vacuum at the center of the cylindrical enclosure. This vacuum risks suctioning the particles, thereby harming the proper operation of the separating device 12.

In order to limit this phenomenon, the purifying device 10 includes, for each separating device 12, a blower nozzle 68 arranged between the air circulation enclosure 22 and the first base 32 of the collecting device 26, designed to blow the gas at the center of the air circulation enclosure 22. The gas flow on that nozzle 68 makes it possible to compensate for the vacuum generated by the vortex.

It will be noted that the air can be suctioned from the outside by the vacuum formed in the separating device 12, or alternatively may result from a compressed gas injected into the enclosure 22.

Preferably, the blower nozzles 68 have a shared supply, and to that end are supported by a blower ring 70 comprising a supply duct 72.

Figure 12:
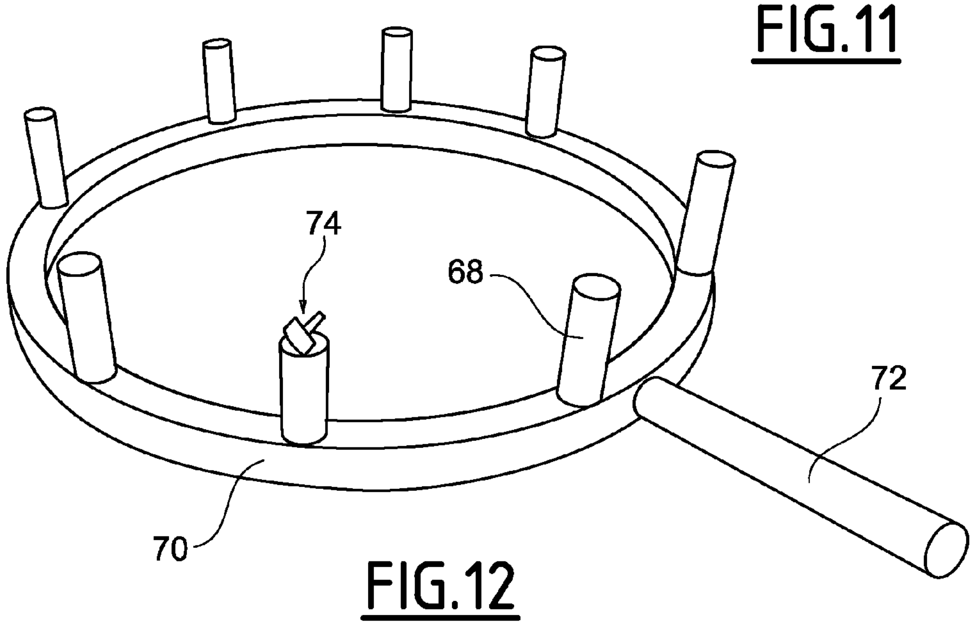
FIG. 12 is a perspective view of a set of blower nozzles equipping the device of FIG. 11.

Preferably, as shown in FIG. 12, at least one nozzle 68 includes an element 74 for orienting the blown gas, for example an inclined plate, making it possible to impart an initial rotation to the injected air corresponding to the direction of the vortex generated in the separating device 12.

It will be noted that the invention is not limited to the embodiments previously described, but may assume various alternatives without going beyond the scope of the claims.

The invention claimed is:

1. A collecting device for collecting particles, including dust, designed to equip a device for purifying a gas by extracting particles, including:

a chamber, including an inner wall that is generally cylindrical around a central axis, said inner wall extending parallel to the central axis between first and second substantially parallel bases, the chamber having an inlet opening and an outlet opening, and a rotor which is rotatable around the central axis, and which includes at least three blades, each of which extends radially from a rotary shaft to the inner wall while defining, within the chamber, compartments which are sized such that the inlet and outlet openings are in constant communication with separate compartments, wherein the inlet opening is formed in the first base, and the outlet opening is formed in the second base, and wherein the first base is provided, at the end of the chamber, with a driving device for driving particles toward the inlet opening, said driving device including blades for scraping an outer face of the first base, rotating around an axis, each extending from a rotating shaft.

2. The collecting device according to claim 1, wherein each inlet and outlet opening has dimensions, including a diameter, smaller than half of a diameter of the chamber.

3. A purifying device for purifying a gas, including air, by extracting particles, including dust, including a collecting device, and at least one separating device for separating particles and gas, wherein:

the collecting device includes:

a chamber, including an inner wall that is generally cylindrical around a central axis, said inner wall extending parallel to the central axis between first and second substantially parallel bases, the chamber having an inlet opening and an outlet opening, wherein the inlet opening is formed in the first base, and the outlet opening is formed in the second base and wherein the first base is provided, at the end of the chamber, with a driving device for driving particles toward the inlet opening, said driving device including blades for scraping an outer face of the first base, rotating around an axis, each extending from a rotating shaft, and a rotor which is rotatable around the central axis, and which includes at least three blades, each of which extends radially from the rotary shaft to the inner wall while defining, within the chamber, compartments which are sized such that the inlet and outlet openings are in constant communication with separate compartments, and each separating device includes:

an inlet duct for gas charged with particles, a cleaned gas outlet duct, and an outlet duct for the particles arranged upstream from the inlet opening of the collecting device.

4. The purifying device according to claim 3, wherein each separating device includes an air circulation enclosure, which is generally cylindrical, in which the gas inlet and outlet ducts emerge, and extending up to the first base of the collecting device, each separating device also comprising a guide member with a generally conical tapered shape, arranged substantially coaxially to the cylindrical enclosure, and the large cross-section of which has a diameter smaller than that of the cylindrical enclosure and is arranged across from the first base of the collecting device.

5. The purifying device according to claim 4, wherein each separating device includes means for translating the guide member along an axis and/or a vibrating device for causing that guide member to vibrate.

6. The purifying device according to claim 3, wherein each separating device includes an air circulation enclosure, which is generally substantially cylindrical, in which the gas inlet and outlet ducts emerge, and extending up to the first base of the collecting device, the purifying device comprising a blower nozzle arranged between the air circulation enclosure and the first base of the collecting device, oriented toward the air circulation enclosure.

7. The purifying device according to claim 6, wherein the nozzle includes a member for orienting the blown gas.

8. The purifying device according to claim 3, wherein the cylindrical enclosure has a diameter substantially equal to that of the first base.

9. A purifying device according to claim 3, including at least two separate devices, housed in a cylindrical support element, arranged in parallel, and positioned in a circle with a diameter smaller than that of the first base, the outlet duct for the particles of each separating device being arranged across from said first base.

10. The purifying device according to claim 9, including a general gas supply duct, connected to the inlet duct of each separating device by means of a supply enclosure, and a general gas discharge duct, connected to the outlet duct of each separating device by means of a discharge enclosure.

11. The purifying device according to claim 10, wherein one among the general supply duct and the general gas discharge duct extends substantially tangentially to the cylindrical support element, and the other among the general supply duct and the general gas discharge duct extends substantially coaxially or tangentially to the cylindrical support element.

12. The purifying device according to claim 3, including a plurality of separating devices arranged in parallel, and positioned in a spiral with a diameter smaller than that of the first base, the outlet duct for the particles of each separating device being arranged across from said first base.

13. A purifying device according to claim 12, including a central separating device whereof the diameter is larger than that of the other separating devices, arranged at the center of spiral.

14. The purifying device according to claim 3, wherein each separating device includes an air circulation enclosure, comprising:

a first substantially cylindrical portion, in which the gas inlet and outlet ducts emerge, a second substantially tapered portion, extending while becoming narrower from a large cross-section connected to the first part to a small cross-section arranged across from the first base of the collecting device, and a third substantially tapered portion, extending while becoming wider from a small cross-section connected to the small cross-section of the second tapered portion, up to a large cross-section arranged across from the first base of the collecting device.

15. The purifying device according to claim 14, wherein the large cross-section of the third tapered portion has a diameter substantially equal to that of the first base of the collecting device.

* * * * *

UNITED STATES PATENT AND TRADEMARK OFFICE

CERTIFICATE OF CORRECTION

PATENT NO. : 8,951,320 B2
APPLICATION NO. : 13/823468
DATED : February 10, 2015
INVENTOR(S) : Serguei Gladkov It is certified that error appears in the above-identified patent and that said Letters Patent is hereby corrected as shown below:

On the title page, Item (12) should read as follows: Gladkov

On the title page, Item (75) to read as follows:

--(75) Inventor: Serguei Gladkov, Lexy (FR)--.

Signed and Sealed this
Second Day of June, 2015

Michelle K. Lee
*Director of the United States Patent and Trademark Office*